United States Patent
De Peuter et al.

(10) Patent No.: US 8,082,275 B2
(45) Date of Patent: Dec. 20, 2011

(54) SERVICE MODEL FLIGHT RECORDER

(75) Inventors: Geert De Peuter, Turnhout (BE); David Bonnell, Reading (GB); Eric J S Pieters, Mechelen (BE)

(73) Assignee: BMC Software, Inc., Houston, TX (US)

( * ) Notice: Subject to any disclaimer, the term of this patent is extended or adjusted under 35 U.S.C. 154(b) by 441 days.

(21) Appl. No.: 12/123,779

(22) Filed: May 20, 2008

(65) Prior Publication Data
US 2009/0292720 A1  Nov. 26, 2009

(51) Int. Cl.
*G06F 17/30* (2006.01)
(52) U.S. Cl. ........ 707/798; 705/7.27; 709/223; 709/224
(58) Field of Classification Search ........................ None
See application file for complete search history.

(56) References Cited

U.S. PATENT DOCUMENTS

| | | | |
|---|---|---|---|
| 5,483,468 A * | 1/1996 | Chen et al. | 702/186 |
| 6,208,955 B1 * | 3/2001 | Provan et al. | 703/20 |
| 6,349,406 B1 * | 2/2002 | Levine et al. | 717/128 |
| 6,539,337 B1 * | 3/2003 | Provan et al. | 702/183 |
| 6,651,183 B1 * | 11/2003 | Gensler et al. | 714/4 |
| 6,791,552 B2 * | 9/2004 | Gould et al. | 345/506 |
| 6,965,816 B2 * | 11/2005 | Walker | 701/16 |
| 7,055,098 B2 * | 5/2006 | Hull et al. | 715/275 |
| 7,113,852 B2 * | 9/2006 | Kapadia et al. | 701/33 |
| 7,203,624 B2 * | 4/2007 | Warshawsky | 702/186 |
| 2005/0010812 A1 * | 1/2005 | Terrell et al. | 713/201 |
| 2005/0071187 A1 * | 3/2005 | Zubizarreta | 705/1 |
| 2005/0097149 A1 * | 5/2005 | Vaitzblit et al. | 707/202 |
| 2005/0216793 A1 * | 9/2005 | Entin et al. | 714/38 |
| 2009/0171731 A1 * | 7/2009 | Bobak et al. | 705/8 |
| 2009/0171732 A1 * | 7/2009 | Bobak et al. | 705/8 |
| 2009/0248611 A1 * | 10/2009 | Xu et al. | 707/1 |
| 2010/0138533 A1 * | 6/2010 | Pauly | 709/224 |

FOREIGN PATENT DOCUMENTS
WO  WO 2008129243 A2 * 10/2008

OTHER PUBLICATIONS

Komlodi et al., "A User-centered Look at Glyph-based Security Visualization," 2005, IEEE, Workshop on Visualization for Computer Security.*
Xu et al. "Retrace: Collecting execution trace with virtual machine deterministic replay." In Proceedings of the 3rd Annual Workshop on Modeling, Benchmarking and Simulation, MoBS, San Diego, CA, June, vol. 3, pp. 4-2, 2007.*
Joshi et al., "SCARPE: A Technique and Tool for Selective Capture and Replay of Program Executions," IEEE, Software Maintenance, 2007.*
www.zenulta.com/ourfocus/index.htm. Accessed May 20, 2008.
Zenulta—Solutions; Downloaded from http://www.zenulta.com/solutions.htm on May 20, 2008.

* cited by examiner

*Primary Examiner* — Robert Timblin
*Assistant Examiner* — Richard Bowen

(57) ABSTRACT

A method, system and medium for recording events in a system management environment is described. As system events are detected in an enterprise computing environment they are stored in a manner allowing them to be "replayed" either forward or reverse to assist a system administrator or other user to determine the chain of events that affected the enterprise. The system engineer and business process owner are therefore presented with pertinent information for monitoring, administrating and diagnosing system activities and their correlation to business services.

28 Claims, 3 Drawing Sheets

SERVICE MODEL FLIGHT RECORDER

BACKGROUND

The invention relates generally to service impact management and problem diagnosis in a business service management (BSM) environment. More particularly but not by way of limitation, to a method and system for enhancing the capability of service impact management by allowing full Video Cassette Recorder (VCR) like viewing of a visualized service model. One benefit of the invention is that it allows users to more easily identify the cause of business impacting events.

Business Service Management (BSM) is a methodology of viewing technology infrastructure administration and problem diagnosis from the perspective of its impact on critical business services rather than technology silos. One of the requirements of BSM is Service Impact Management (SIM). SIM is the ability to determine, visualize, report and diagnose the impact of problems reported in technology infrastructure based on the impact these problems impose on business services that utilize the affected pieces of technology infrastructure.

SUMMARY

In one embodiment the invention provides a method to record changes to a service impact model represented in a directed acyclic graph (DAG) such that they may be replayed by a user (e.g., a system administrator) to determine the chain of events that led to a system outage.

In a further embodiment the events and system interruptions are correlated against a business process to allow for business service management (BSM) support. In order to support a business, the BSM methodology correlates technology infrastructure to the business process which that piece of technology supports either in whole or in part. By correlating the supporting role of each piece of technology infrastructure, system administrators and business process owners can understand the business impact of each problem occurring in the technology infrastructure. This understanding will allow system administrators and business owners to be both reactive and proactive when addressing requirements of their technology infrastructure.

In yet a further embodiment, the invention provides for retroactively calculating metrics (e.g., Mean Time To Repair "MTTR" and Mean Time Between Failure "MTBF" at any given point in time. Any number of available metrics, such as service level agreement violations or trouble ticket reports, may be stored and associated with time or elements of the service model representing components of the information technology infrastructure to provide a comprehensive method of managing the information technology infrastructure and to provide support for business process planning.

DETAILED DESCRIPTION

Figure 1:
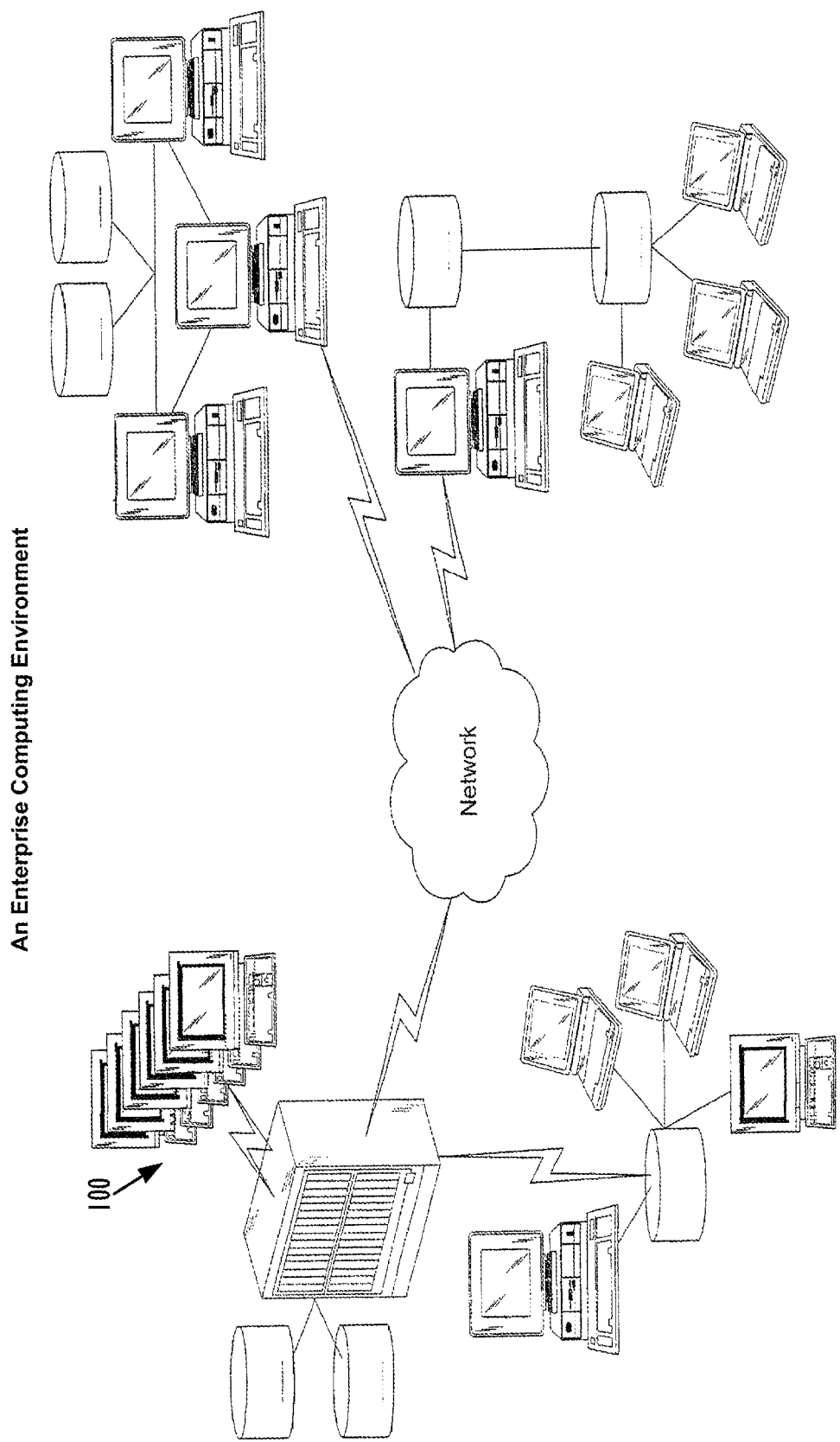
FIG. 1 shows an illustrative enterprise computing environment.

The instant disclosure describes various embodiments for use in SIM or systems management environments. By way of example, not intended to limit the scope of the claimed invention, the instant disclosure describes a particular embodiment of an enterprise computing environment 100 as seen in FIG. 1 where multiple components of information technology (IT) infrastructure are networked together to provide an IT infrastructure supporting a business operation.

A company's success today is integrally linked with its IT services. Any disruptions or degradations in IT service can cause serious, even catastrophic, damage to business. That means that IT professionals are under considerable pressure to ensure that required IT service levels are delivered to users. Considering the complexity and dynamic nature of today's enterprise networks, it can be quite a challenge to achieve the high levels of service users require. Efficient impact propagation is important for properly managing the complexity and dynamic nature of today's enterprise systems so that the delivery of IT services can remain closely aligned with business requirements.

Because of the nature of system or service monitoring, it is likely that multiple impacting events (e.g., computer off-line or sub-network outage) will have to be processed at the same time or in close temporal proximity to each other. Furthermore, these events often result in overlapping impact sets (the set of graph nodes impacted by a given event). As a result, traditional impact propagation techniques often require redundant graph traversal and impact calculations.

For example, a disk outage (i.e., alarm state) may affect the service level at a computer and may place that computer or a particular business function executing on that computer into a WARNING or ALARM state. If the particular business function affected by the outage is accounts receivable, the service impact model would be updated to reflect the accounts receivable service is impacted in some way.

An efficient method of propagating state changes is described in U.S. patent application Ser. No. 11/956,507 entitled "Impact Propagation in a Directed Acyclic Graph," which is hereby incorporated by reference in its' entirety. An efficient method of propagation, taking into account different viewer permissions, is described in U.S. patent application Ser. No. 11/956,522 entitled "Impact Propagation in a Directed Acyclic Graph Having Restricted Views," which is hereby incorporated by reference in its' entirety.

To aid in understanding the embodiments described herein, the following definitions are provided:

Service Model Change: adding or deleting a node from the graph that represents the service model, where nodes in the graph represent a component of the technology infrastructure;

Service Model Version: a full service model or a reference to a base complete service model definition and a set of service model changes;

Snapshot: a record of a service model version containing the state of leaf vertices and any associated data required to re-create the complete service model and all associated attributes, such as derived metrics, at the point in time of the snapshot, wherein the data may be incorporated directly or by reference;

Delta: a record of changes that have occurred over a specific period of time, wherein the record must contain the state changes of leaf vertices during the period and may optionally contain changes to the service model structure;

Bookmark: a system or user defined point in time which may optionally be associated with a vertex of the service model and may also be created to indicate the time at which snapshots are created, SLA violations occur, trouble tickets are created, etc.;

Key performance indicator (KPI): an important measure of performance, such as percentage service availability;

Service Level Agreement (SLA): An agreement between a service provider and a customer that specifies the required level of service that should be offered and is usually measurable in terms based on KPI's;

SLA violation: a point in time where one or more key performance indicators (KPIs) of an element of the service model deviate beyond one or more threshold(s) set in the service level agreement.

Service outages are often caused not by a single catastrophic failure but by cascades of multiple, smaller failures that occur over a period of time which can span hours to days or even longer. Current SIM systems only allow a user to visualize the state of a service model and a list of impacting problems at a particular point in time (i.e., at the point in time where the aggregate effect of these underlying problems has reached a crucial point for the business service). A service model flight recorder in accordance with the invention allows a user to go back in time and visualize the state of the service model at any recorded historical time, providing far greater insight into the sequence of problems that ultimately triggered a given service interruption. Furthermore, a user would be capable of moving either forward or backward in time relative to a selected time to visualize and possibly determine if other problems potentially contributed to a given service disruption.

Service models are typically organized in a DAG (Directed Acyclic Graph) in which vertices represent business services, business functions and IT infrastructure elements and edges represent impact relationships between vertices. Whenever the service model definition changes, the system will keep a record of the changes so that a Service Model Flight Recorder in accordance with the invention is able to re-create the service model at any point in time. Said changes may include adding new vertices or edges, removing existing vertices or edges, changing the attributes of vertices or edges but not changes to the state of vertices, which are recorded independently. Said record may be a complete copy of the service model after application of each set of changes, or a change list containing the discrete differences between the old and new service models. As a consequence of these elements, a Service Model Flight Recorder methodology in accordance with the invention implicitly provides for service model versioning.

A purpose of the service model is to facilitate service impact management (SIM) by propagating state changes to leaf vertices along the edges to other non-leaf vertices, determining the impact of each change to each other vertex. State changes may arise as a result of events in an event management (EM) system, such as the BMC Event Manager (BEM) and PATROL Enterprise Manager (PEM) applications, both available from BMC Software, Inc. These state changes need to be recorded in order to re-create the state of the service model at any point in time. Said record may be stored in a log file or other persistent storage like a database. Only changes to the leaf vertices must be logged because the state of all non-leaf vertices can be re-computed from these states and the service impact model.

The state of business services in the service model is often used to compute service level agreement (SLA) compliance. The service model flight recording of a determined period of time prior to each service interruption could be attached to each SLA violation as documentary evidence of each service interruption that contributed to the SLA violation and allow for a detailed post mortem analysis of the interruption. This can be invaluable in the event that there is debate over the cause of an interruption or the validity of the service model.

The time period of data to attach to the SLA violation could be pre-defined by the user. For example, 4 hours. Alternatively the time period may be automatically determined by the system. For example, the system may use the Service Model Flight Recorder to back-trace to the point at which the current service interruption commenced, or to a time just after a prior service interruption was cleared/resolved.

A business process or IT service may slowly degrade over time as several underlying components sequentially fail or may result from a quickly cascading series of events. Being able to "rewind" the service model to clearly visualize this sequence of events is extremely useful in diagnosing the conditions that eventually led to the service outage or even a degradation currently being experienced. In one embodiment of this invention, replay of stored data may be decelerated or accelerated to assist in this function.

Figure 2:
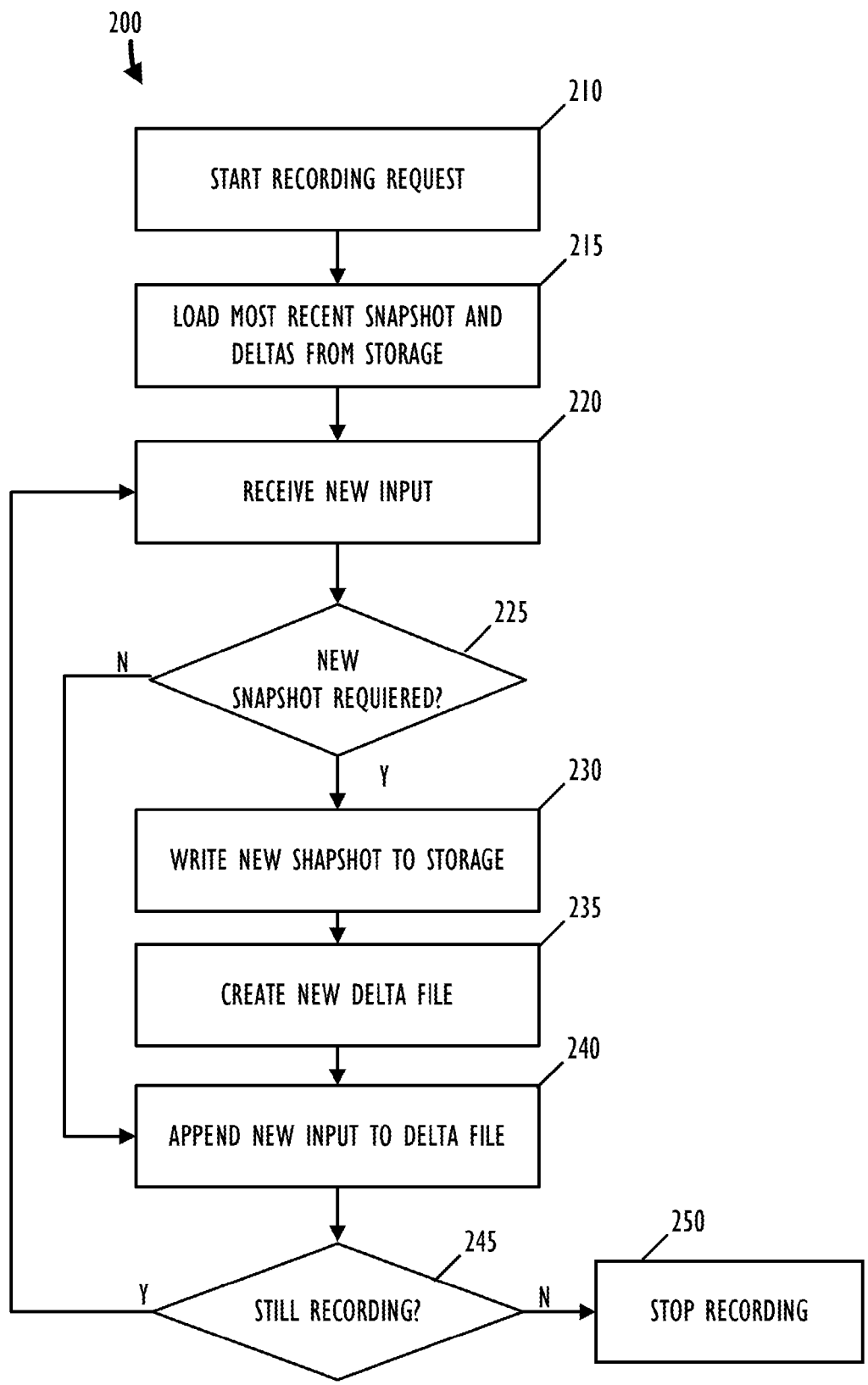
FIG. 2 shows, in flowchart form, an illustrative recording process.

Referring to FIG. 2, a flow chart describing one possible embodiment of a recording process 200 in accordance with the invention is shown. A start recording request is received as input at block 210. The system is then initialized at block 215 by loading the most recently saved snapshot. If no snapshots are available the system is initialized with a default service model representing the currently known states for each node in the service model under investigation. After this initialization the system further checks if one or more delta files need to be applied to the service model.

After the system completes this initialization process flow continues to block 220 where the process waits until new input is received. New input can include a state change to a node in the service model, a service model definition change (e.g., a node added to the service model) or a SLA violation detection. Decision block 225 determines when a new snapshot should be saved rather than storing updates into a delta file. Typically a new snapshot may be required to optimize storage and processing functions. One example, which will be described in more detail below, is to store a new snapshot when the sum of the information in the delta file would take longer to process than storing and loading a new snapshot file. In a default embodiment, a new snapshot is created for each service model change or SLA violation. When no new snapshot is required, flow continues at block 240 and the input received is appended to the then current delta file. Decision block 245 determines if the system is still in record mode and if so returns to block 220 to await further input.

When block 225 determines that a new snapshot is required, block 230 writes the snapshot file to persistent storage and initializes a new delta file at block 235. When block 245 determines that the recording process is to be terminated, flow continues to block 250 where the current delta and snapshot files are closed and stored to persistent storage as required.

Figure 3:
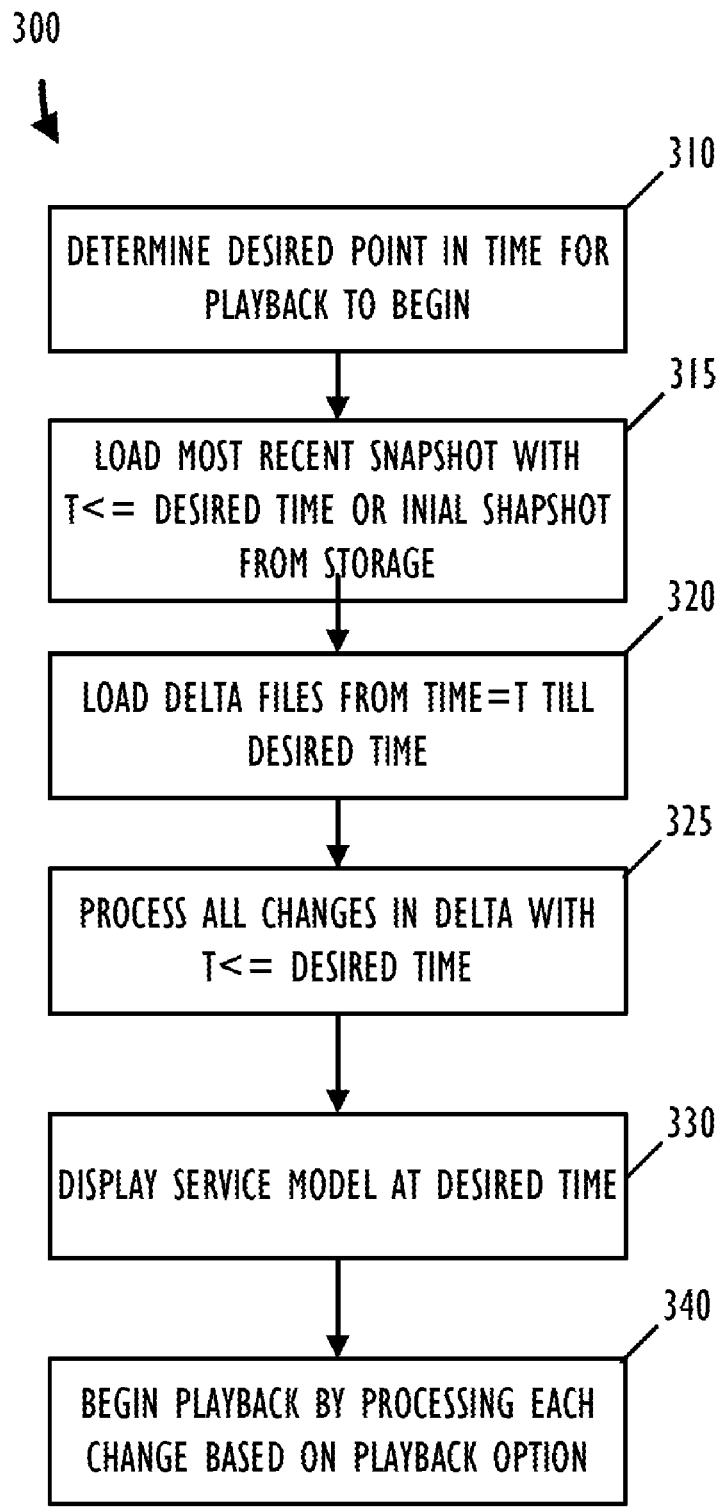
FIG. 3 shows, in flowchart form, an illustrative play-back process.

Referring now to FIG. 3, process 300 illustrates a process to return a previously recorded service model to a desired point in time for observation. Block 310 determines the desired time for establishing an initial state of a service model, typically via user input. Block 315 loads a snapshot of the service model saved at the most recent time previous to the desired time identified during the acts of block 310. Block 320 loads any delta files that contain changes between the time of the snapshot loaded in block 315 and the desired time identified during the acts of block 310. Each change from the loaded delta file(s) that was recorded earlier than the desired time is applied (block 325) to the service model loaded from the snapshot selected in block 315. Now that the service model has been restored to its state at the desired time, the service model is displayed to a user (e.g., system administrator) at Block 330. Flow continues to block 340 where the user can play back each new input (e.g., changes/events recorded in the loaded delta file(s)) in a multitude of ways (e.g. real-time forward, real-time backward, fast forward or skip time), these playback options will be described in more detail below.

The instant disclosure allows advanced playback features including bookmarks, fast forward/rewind to next/previous state change of the entire model or to a given node. Once the desired starting point is reached, playback can easily proceed either forward or backward in time by simply applying or reversing the effect on the service model of the next or previous state change from the recording. Playback may occur at any speed, optionally providing for automatic fast forwarding over periods of little or no activity and then automatically reverting to normal play speed during periods of activity.

In addition to traditional VCR-like controls (e.g., play, pause, step forward, step backward, fast forward and fast reverse), additional features not typical of a traditional VCR may be supported. For example, digital video disk (DVD) like navigation menus can be implemented by automatically creating a "chapter" bookmark for each snapshot. A graphical representation of the service model's top-level could be used as a thumbnail for each chapter in the menu. This thumbnail image could be generated either at the time the snapshot was taken, or generated at the time of play-back by quickly jumping to the bookmark and rendering a representation to an off-screen bitmap. Additionally, a user may replay changes to the service model by stepping to next/previous state change anywhere in the service model, or on a given node. To support this feature, service model snapshots could record for each object in the service model a timestamp of its last state change. If the service model is a multi-rooted DAG a synthetic super-root node which encompasses all actual root nodes could be generated. When searching for a "next change", the player can skip forward at a snapshot level until it identifies the snapshot after which a change has occurred, go back one snapshot from that point and then go forward at the state change level to identify the next state change of the requested node.

A graphical representation of activity over long periods of time may be used to provide navigation to the periods which are most likely to be of interest. For example, a histogram showing the average number of state changes in each 15 minute interval. The position of bookmarks may be overlayed on such a histogram.

Histograms present a summarized view of the data and may either be calculated on the fly or recorded over time. For example, by recording the number state changes over the last 15 minutes to a delta file every 15 minutes. Different histograms may be used for different purposes. For example, a specific histogram may only incorporate state changes on network elements. In general, a histogram incorporates only the changes that match a set of user-defined filters based on attributes of the service model vertices.

The speed at which state changes can be applied to the model based on methods disclosed in U.S. patent application Ser. No. 11/956,507 entitled "Impact Propagation in a Directed Acyclic Graph," (>100,000 events/second), means that the time required to move from a given snapshot to any point in time is limited only by the I/O speed at which state changes can be read from disk. It is recognized, however, that the system will reach a point where the cost of reading the volume of state changes since the last snapshot will outweigh the cost of storing and processing an entire snapshot. For efficiency, the system could automatically store a snapshot at this calculated time.

Automatic snapshots may be scheduled according to a predefined schedule, such as daily, or when an optimal point has been reached based on the following expression becoming false.

$$S_r^{t0} + S_e^{t0} < \sum_{t=t0}^{tn} (SC_r^t + SC_e^t)$$

That is, while the cost of reading snapshot from time t0 ($S_r^{t0}$) and executing that snapshot ($S_e^{t0}$) is less than the aggregate cost of reading ($SC_r^t$) and executing ($SC_e^t$) all leaf vertice state changes made from the time of last snapshot (t0) to the current point in time (tn), it is better to continue saving leaf vertice state changes rather than to make another snapshot.

The cost of reading snapshots is dependent on the I/O speed of the system and snapshot size. The snapshot includes two components, service model and current state of any degraded leaf verticies. Both of these sizes can be monitored to maintain a running estimate of the size of service model snapshot requirements at the current point in time.

The cost of executing service model changes is generally dependent on CPU speed of the system but if methods disclosed in U.S. patent application Ser. No. 11/956,507 entitled "Impact Propagation in a Directed Acyclic Graph," are utilized this component is expected to be negligible and may be omitted from the equation to simplify the determination to:

$$S_r^{t0} < \sum_{t=t0}^{tn} (SC_r^t + SC_e^t)$$

By monitoring the time it takes to load the initial model at system startup, a reasonable estimate for $S_r^{t0}$ may be obtained. Based on size of loaded model, a model estimated read rate may also be computed and used to calculate an estimate for $SC_r^t$. A running estimate of $SC_e^t$ could be calculated as the system executes each incoming state change. However as for $S_e^{t0}$ above, relative to $SC_r^t$. the execution time is expected to be negligible and when omitted the equation may be further simplified to:

$$S_r^{t0} < \sum_{t=t0}^{tn} SC_r^t$$

As described, a possible minimum data storage requirement for the service model flight recorder has been established.

It is common for state changes in SIM systems to be driven directly off events from an event management (EM) system, such as BMC's Event Manager (BEM) or PATROL Enterprise Manager (PEM) products, both available from BMC Software, Inc. The system may typically also record impacting events by reference to allow reverse association between service model state changes and causal IT infrastructure events.

In one embodiment, the system may also record trouble ticket ids as well as additional metadata that may be required to derive additional metrics such as MTBF (Mean Time Between Failure), MTTR (Mean Time To Repair), at any point in time. Methods of calculating MTBF and MTTR are generally known in the art.

In order for the Service Model Flight Recorder to calculate and display such statistics during playback, additional metadata may need to be stored with snapshots or deltas for each vertex at which such reports are desired. This may be all vertices, non-leaf vertices, or only vertices with given values for other service model attributes, such as service type, priority, etc.

For example, for each such node it is possible to maintain three additional attributes lastStateChangeTime (time of nodes last transition from OK to DEGRADED or vice versa), MTTR and MTBF With MTTR and MTBF computed as weighted moving averages. The value of these attributes will be calculated by the system with each state change and may either be persisted in the delta file, an ancillary file or only in the service model snapshot for each such node. If persisted only in the snapshot, the value may be recalculated during playback.

When a node transitions from OK to DEGRADED, if it's lastStateChangeTime has not been set, then this node has not previously had a failure so no changes are made to it's associated MTTR or MTBF value(s). The lastStateChangeTime is set to the current time (or time of impact, if that is derived from, for example, an event received from an event management system), t. If lastStateChangeTime is set to a value then it indicates the time at which this node recovered from its previous failure.

When a node transitions from DEGRADED to OK, if lastStateChangeTime is not set then time of last failure is unknown. The lastStateChangeTime is set to the current time (or time of impact, if that is derived from, for example, an event received from an event management system), t. If lastStateChangeTime is set it indicates the time at which current service interruption occurred.

Another embodiment of this invention will allow running a what-if analysis on the service model, where a what-if analysis can be shown alongside the actual playback of the current state. Using split-pane visualization techniques, a pane could contain: the actual service model as it has been recorded, a different service model version with the same leaf impacts, the actual service model version with different impacts or a different service model version with different impacts. A split-pane view could be implemented as a true split pane or the various simulations could be rendered in separate windows.

Another embodiment of this invention would provide for limiting the scope of the service model to only certain subsets of the service model. For example, limiting the scope to only the technical components would result in flattening out the hierarchy and only showing leaf vertex transitions instead of showing a complete service model.

The description above is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

Various changes in the details of the illustrated operational methods are possible without departing from the scope of the following claims. For instance, illustrative record processing 200 may perform the identified steps in an order different form that disclosed here. Alternatively, some embodiments may combine the activities described herein as being separate steps. Similarly, one or more of the described steps may be omitted, depending upon the specific operational environment the method is being implemented in. In addition, acts in accordance with FIGS. 2 and 3 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs" or field programmable gate array ("FPGAs"). Storage devices, sometimes referred to as computer readable medium, suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A method, comprising:
    recording a plurality of changes, over a time period, to a computing environment, at least one change from the plurality of changes being associated with a service impact to the computing environment;
    defining within a first directed acyclic graph a first state of the computing environment at a first time within the time period based on the plurality of changes, the first directed acyclic graph including a plurality of nodes representing a plurality of devices within the computing environment, each node from the plurality of nodes having a state;
    defining within a second directed acyclic graph a second state of the computing environment at a second time within the time period based on the plurality of changes;
    calculating a level of activity related to the computing environment over at least a portion of the time period; and
    triggering display of the first directed acyclic graph and display of the second directed acyclic graph at variable speeds based on the level of activity related to the computing environment over the at least the portion of the time period.

2. The method of claim 1, further comprising recording changes associated with at least a portion of the nodes based on events reported by a system monitoring tool.

3. The method of claim 1 further comprising calculating a business impact based on a state of a node from the plurality of nodes included in the first directed acyclic graph.

4. The method of claim 1, further comprising providing at least one statistical measure between the first time and the second time.

5. The method of claim 4 wherein the at least one statistical measure includes at least one of a mean time to repair or a mean time between failures.

6. A computer readable medium having instructions stored thereon for causing a programmable control device to perform the method of claim 1.

7. A computer network comprising:
    a plurality of processing units communicatively coupled to a computer network, the plurality of processing units configured to perform the method of claim 1.

8. A computer system comprising one or more programmable control devices communicatively coupled to each other and to a computer network, the one or more programmable control devices are programmed to perform the method of claim 1.

9. The method of claim 1, wherein the second directed acyclic graph includes a plurality of nodes different from the plurality of nodes included in the first directed acyclic graph, relationships between the plurality of nodes of the first directed acyclic graph are different from relationships between the plurality of nodes of the second directed acyclic graph.

10. The method of claim 1, further comprising associating a violation of a service level agreement with the service impact.

11. The method of claim 1, further comprising:
defining a delta file based on at least a portion of the plurality of changes, the delta file including differences between the computing environment at the first time and the computing environment at the second time, the defining of the second directed acyclic graph is based on the delta file.

12. The method of claim 1, wherein the second directed acyclic graph is defined based on a delta file including recorded differences between the computing environment at the first time and the computing environment at the second time.

13. The method of claim 1, further comprising:
projecting a time duration for processing a delta file representing changes between the computing environment at the first time and the computing environment at the second time, the defining associated with the second directed acyclic graph includes defining the second directed acyclic graph as a new snapshot file based on the time duration.

14. The method of claim 1, wherein the recording is initiated based on a default service model representing the computing environment.

15. The method of claim 1, wherein at least a portion of the nodes from the plurality of nodes included in the first directed acyclic graph are classified as leaf vertices and at least a portion of the nodes from the plurality of nodes included in the first directed acyclic graph are classified as a non-leaf vertices, at least a portion of the leaf vertices have state changes defined based on logged data and at least a portion of the non-leaf vertices have re-computed state changes.

16. A method, comprising:
representing at least a portion of a computing environment as a directed acyclic graph including a plurality of nodes and relationships between the plurality of nodes;
storing a plurality of state changes to the computing environment as a plurality of changes to the directed acyclic graph, the plurality of state changes to the computing environment being within a time period;
calculating a level of activity related to the computing environment over at least a portion of the time period; and
triggering a visual representation of at least a portion of a state of the computing environment at a time within the time period based on a change to the directed acyclic graph from the plurality of changes to the directed acyclic graph, the triggering of the visual representation being performed at variable speeds based on the level of activity related to the computing environment over the at least the portion of the time period.

17. The method of claim 16, wherein the visual representation is a first visual representation of the state of the computing environment at a first time in a first area of a display unit,
the method further comprising:
triggering a second visual representation of a state of the computing environment at a second time in a second area of the display unit.

18. The method of claim 16, further comprising the plurality of state changes are based on events reported by a system monitoring tool.

19. The method of claim 16, wherein the visual representation of the at least the portion of the state of computing environment includes the state of at least a portion of the nodes included in the directed acyclic graph.

20. The method of claim 16, wherein the visual representation includes a business impact calculation based on the at least the portion of the state of the computing environment.

21. The method of claim 16, wherein the visual representation includes at least one statistical measure related to the plurality of state changes to the computing environment.

22. The method of claim 21 wherein the at least one statistical measure includes at least one of a mean time to repair or a mean time between failures.

23. A computer readable medium having instructions stored thereon for causing a programmable control device to perform the method of claim 16.

24. A computer network comprising:
a plurality of processing units communicatively coupled to a computer network, the plurality of processing units configured to perform the method of claim 16.

25. A computer system comprising one or more programmable control devices communicatively coupled to each other and to a computer network, the one or more programmable control devices are programmed to perform the method of claim 16.

26. The method of claim 16, wherein the plurality of state changes includes a modified attribute of a node from the plurality of nodes propagated within the directed acyclic graph.

27. The method of claim 16, wherein at least a portion of the changes to the directed acyclic graph are stored in a delta file representing differences between the computing environment different times within the time period.

28. A computer readable medium having instructions stored thereon for causing a programmable control device to perform a process, the instructions including instructions to:
record a plurality of changes, over a time period, to a computing environment, at least one change from the plurality of changes being associated with a service impact to the computing environment;
define within a first directed acyclic graph a first state of the computing environment at a first time within the time period based on the plurality of changes, the first directed acyclic graph including a plurality of nodes representing a plurality of devices within the computing environment, each node from the plurality of nodes having a state;
define within a second directed acyclic graph a second state of the computing environment at a second time within the time period based on the plurality of changes;
calculate a level of activity related to the computing environment over the time period; and
replay the changes to the computing environment as represented in a plurality of directed acyclic graphs over the time period at variable speeds based on a level of activity related to the computing environment over the time period, the plurality of directed acyclic graphs including the first directed acyclic graph and the second directed acyclic graph.

* * * * *